(12) United States Patent
Laage

(10) Patent No.: US 6,494,378 B1
(45) Date of Patent: Dec. 17, 2002

(54) CARD READING DEVICE FOR CHIP CARDS AND/OR SIM CARDS HAVING DIFFERENT THICKNESSES

(75) Inventor: Andreas Laage, Bietigheim-Bissingen (DE)

(73) Assignee: Amphenol-Tuchel Electronics GmbH (DE)

( * ) Notice: Subject to any disclaimer, the term of this patent is extended or adjusted under 35 U.S.C. 154(b) by 25 days.

(21) Appl. No.: 09/594,501

(22) Filed: Jun. 16, 2000

(30) Foreign Application Priority Data

Jul. 1, 1999 (DE) .......................... 199 30 389

(51) Int. Cl.[7] .................................. G06K 7/00
(52) U.S. Cl. ................ 235/486; 235/441; 235/483; 235/439
(58) Field of Search ................ 235/441, 483, 235/486, 492, 482, 449, 439

(56) References Cited

U.S. PATENT DOCUMENTS

| 3,755,657 A | * | 8/1973 | Kunz ................... 235/61.11 C |
| 3,899,659 A | * | 8/1975 | Nakai et al. .......... 235/61.11 D |
| 4,864,114 A | * | 9/1989 | Briane et al. ................ 235/480 |
| 4,902,882 A | * | 2/1990 | Lavelle ........................ 235/382 |
| 5,012,078 A | * | 4/1991 | Pernet .......................... 235/441 |
| 5,173,597 A | * | 12/1992 | Anglin ......................... 235/483 |
| 5,198,645 A |   | 3/1993 | Martin et al. ................ 235/441 |
| 5,508,501 A | * | 4/1996 | Fujimoto et al. ............ 235/441 |
| 5,718,609 A | * | 2/1998 | Braun et al. ................ 235/441 |
| 5,872,353 A | * | 2/1999 | Reichardt et al. ........... 235/441 |
| 5,909,025 A | * | 6/1999 | Schmitt et al. .............. 235/492 |
| 5,949,048 A | * | 9/1999 | Nakamura et al. .......... 235/439 |
| 5,969,330 A | * | 10/1999 | Korsunsky et al. ......... 235/486 |
| 6,015,311 A | * | 1/2000 | Benjamin et al. ........... 235/441 |
| 6,138,916 A | * | 10/2000 | Zolkos et al. ............... 235/475 |
| 6,171,002 B1 | * | 1/2001 | Momose et al. ........... 235/449 |

FOREIGN PATENT DOCUMENTS

| EP | 2 633 754 | 1/1990 |
| JP | 6162276 | 6/1994 |

* cited by examiner

Primary Examiner—Karl D. Frech
Assistant Examiner—Uyen-Chau Le
(74) Attorney, Agent, or Firm—Blank Rome LLP

(57) ABSTRACT

A card reader, and a pressing element for a card reader, respectively, are provided for cards having different thicknesses, wherein pressing of the card over an extended surface area is achieved by oppositely disposed bearing points.

12 Claims, 2 Drawing Sheets

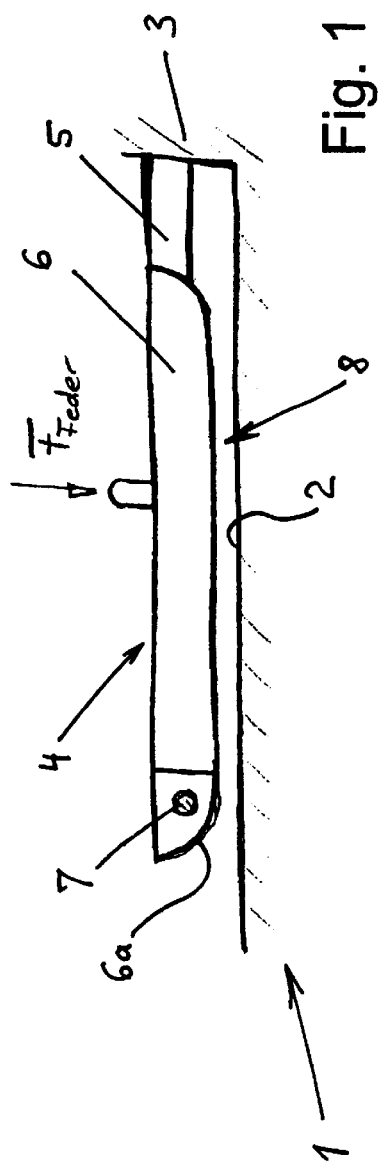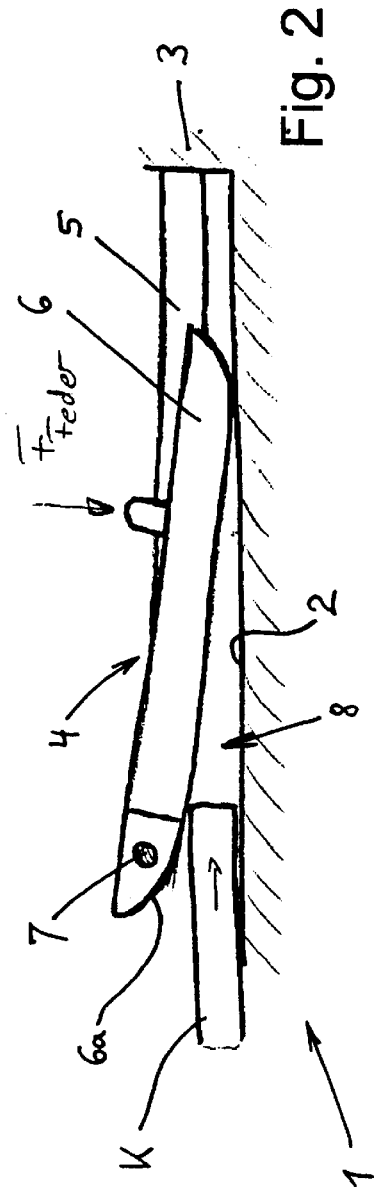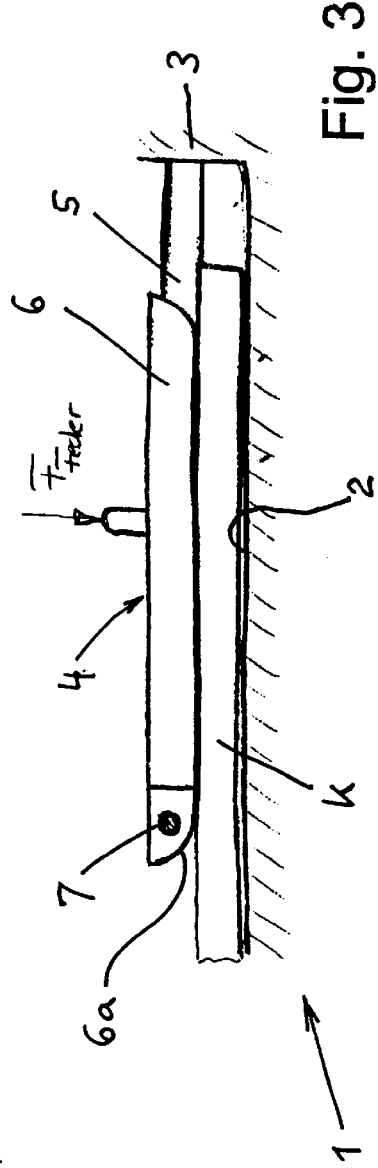

CARD READING DEVICE FOR CHIP CARDS AND/OR SIM CARDS HAVING DIFFERENT THICKNESSES

BACKGROUND OF THE INVENTION

1. Technical Field

The present invention relates to a card reading device for chip cards and/or SIM cards having different thicknesses. More particularly, the present invention relates to a pressing element for cards having different thicknesses resulting in pressing of the cards via an extended surface area.

2. Description of the Prior Art

Card reading devices for chip cards are known as CCAD or chip card acceptor devices. These card reading devices can read either cards having a standard thickness or having a double thickness. A card reading device which is able to read cards of different thicknesses is known from German Patent application No. DE 195 16 987. Therein, cantilevered arms produce the pressure required for the contacts of the inserted card.

Particularly with higher temperatures, such cantilevered arms can produce deformations of the card due to the pressing power being concentrated in relatively small pressure points, which may lead to malfunctions of the card.

It is, therefore, an object of the present invention to provide a card reader and a pressing element, respectively, which overcomes the problems of the prior art and which achieves pressing via an extended surface area even, and particularly, with cards having different thicknesses.

According to a first aspect of the present invention, there is provided a card reader having a housing, said housing comprising a card support surface and an end wall, said card reader comprising two bearing arms, each having a fixed end and a free end, wherein the fixed end of each bearing arm is mounted to said end wall and wherein a pressing plate is pivotably mounted to the free ends of said bearing arms.

According to another aspect of the present invention, there is provided a pressing element for a card reader, said card reader having a housing, said housing comprising a card support surface and an end wall, said pressing element comprising two bearing arms, each having a fixed end and a free end, wherein the fixed end of each bearing arm is mounted to said end wall and wherein a pressing plate is pivotably mounted to the free ends of said bearing arms.

Preferred embodiments of the invention may be gathered from the dependent claims.

The foregoing and other features of the present invention will become apparent to one skilled in the art to which the present invention relates upon consideration of the following description of the invention with reference to the accompanying drawings, wherein:

FIG. 1. is a schematic sectional view of a card reader according to the present invention in a rest position, i. e. without a card being inserted;

FIG. 2 is a schematic sectional view of a card reader according to the present invention in an intermediate position, i. e. at the beginning of insertion of a card;

FIG. 3 is a schematic sectional view of a card reader according to the present invention in a reading position, i. e. with a card being fully inserted.

DESCRIPTION OF PREFERRED EMBODIMENTS

Figure 4:
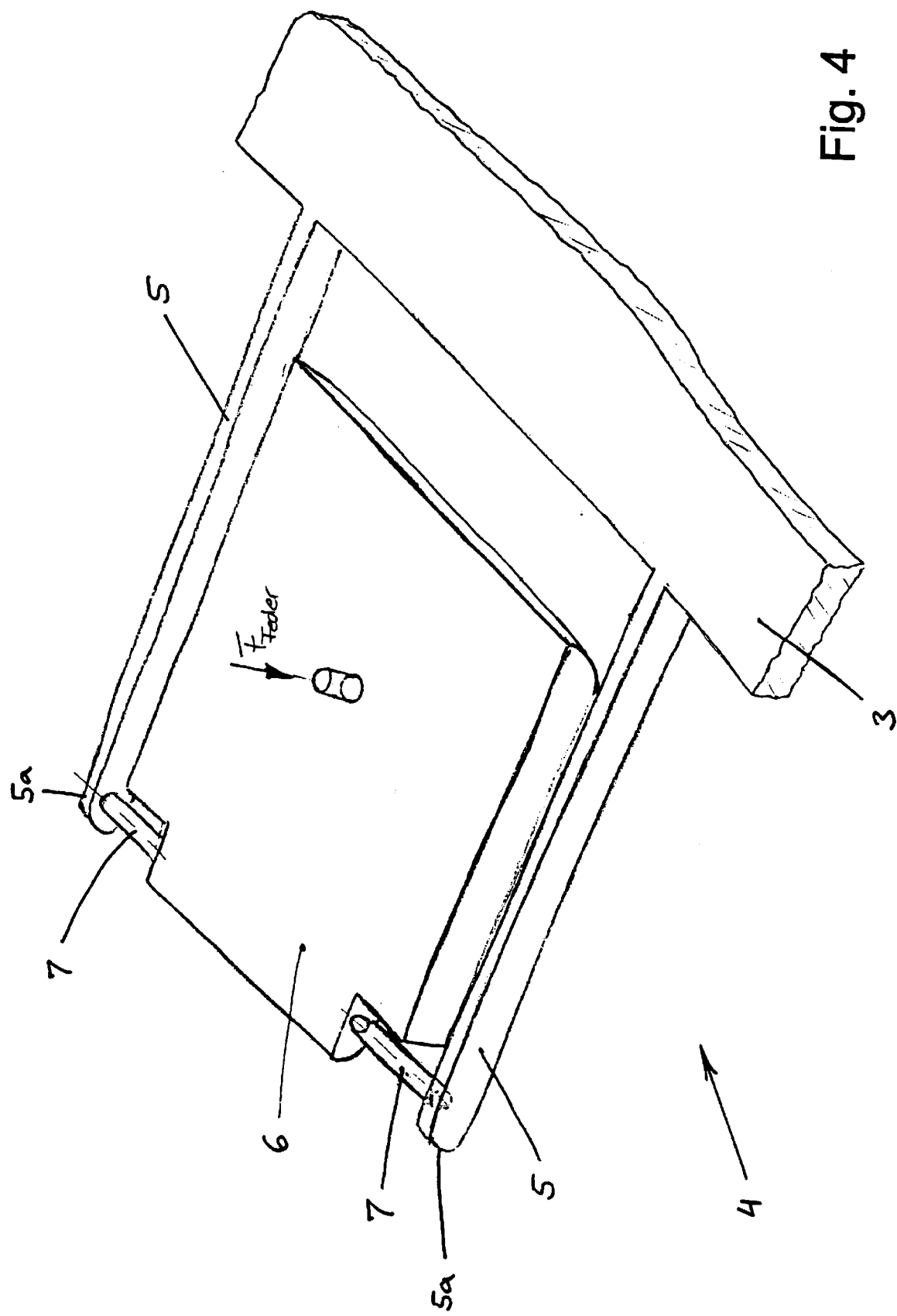
FIG. 4 is a perspective view of the pressing element according to the present invention.

A large variety of card readers are known in the art. Therefore, no description of details of the card reader is given here and only those components or details are described which are considered important for the present invention.

In FIG. 1, a card reader is generally shown at 1. The card reader 1 has a card support surface 2. A pressing element which is generally shown at 4 is mounted at a frontal end wall or housing 3 of the card reader 1. In particular, two bearing arms 5 project in a cantilevered manner from the end wall 3 and extend along the outer sides next to the card support surface 2. A pressing plate 6 is disposed in the free space between the bearing arms 5, said pressing plate 6 being pivotably mounted to the free ends 5a of the bearing arms 5. The pivotable mounting of the pressing plate 6 may be implemented by one or more torsion bars 7 as shown in FIG. 4. However, it is also possible to use, for example, a simple axle or shaft for pivotably mounting the pressing plate 6. It is preferred to form the entire pressing element 4 as one piece, e. g. by plastic injection molding, such that a torsion bar 7 is present on both sides of the pressing plate 6 between said pressing plate 6 and a respective adjacent bearing arm 5. In the rest position shown in FIG. 1, a gap or card plenum (card receiving space) 8 is formed between the card support surface 2 and the pressing plate 6 with said gap or card plenum 8 being smaller than the thickness of a card to be contacted.

If a card K is to be inserted into the card plenum 8 (see FIG. 2), first the rounded or bevelled outer end 6a of the pressing plate 6 is cammed or slid onto the card K, and the pressing plate 6 is slightly tipped (or inclined) such that the free end of the pressing plate 6 is moved towards the card support surface 2. Preferably, also the free end of the pressing plate 6 is rounded or bevelled. As soon as the leading edge of the card K passes the pivot point of the torsion bar 7, the pressing plate 6 pivots into a position parallel to the top surface of the card K. The necessary lifting of the pressing plate 6 for accommodating the relatively thick card K is provided for by corresponding deflection of the bearing arms 5. Since the bearing arms 5 are relatively long and elastic, the necessary lifting or deflection is easily achieved.

When the card K is fully inserted into the card reader 1 (see FIG. 3), the pressing plate 6 contacts the card K via an extended surface area. If additional pressing force is required, such force may be obtained by means of a spring (not shown) acting on the pressing plate. Many other possibilities will occur to the man skilled in the art for applying such spring force to the pressing plate 6; therefore, the spring force is schematically indicated at $F_{Feder}$. Preferably, the spring force is applied to the pressing plate 6 at a location remote from the pivotable mounting thereof, such as the torsion bars 7. This results in advantageous pressing characteristics or pressure distribution over the extended surface area.

FIG. 4 is a perspective view of the pressing element 4 of the present invention. It will be noted that a card to be contacted would have a width approximately equal to the width of the pressing plate 6. In any case, the width of the card would be less than the distance between the bearing arms 5.

The pressing via an extended surface area is also achieved by the "dual" pivotable mounting of the pressing plate 6. On the one hand, the bearing arms 5 are elastically deflected. The bearing arms 5 are fixedly connected at one end thereof to the housing 3. Thus, the free ends 5a of the bearing arms 5 may be deflected e. g. vertically upwardly or downwardly. On the other hand, the pressing plate 6 may additionally pivots by means of the torsion bars 7 around a pivot point near or at the free ends 5a of the bearing arms 5. Thus, contact of the pressing plate 6 and the card K is possible over an extended surface area, independent of the thickness of the inserted card.

Of course, the concept of inducing force in connection with bearing or pivotably mounting of the pressing element at opposite locations for pressing of a card over an extended surface area against respective contacts or contact elements is also applicable to other kinds of card readers. In particular, the present invention is not limited to so-called sliding readers in which the card is slid on a card support surface during insertion thereof. For example, the invention may also find application in card readers in which the pressing plate is pivoted from above onto an inserted card.

From the above description, those skilled in the art will perceive improvements, changes and modifications. Such improvements, changes and modifications within the skill of the art are intended to be covered by the appended claims.

Having described the invention, I claim:

1. Card reader having a housing, said housing comprising a card support surface and an end wall, said card reader comprising two bearing arms, each having a fixed end and a free end, wherein the fixed end of each bearing arm is mounted to said end wall and wherein a pressing plate is pivotably mounted to the free ends of said bearing arms, wherein the pressing plate is pivotably mounted by means of at least one torsion bar.

2. Card reader as defined in claim 1 wherein said pressing plate extends between said bearing arms.

3. Card reader as defined in claim 1 wherein a spring force acts on said pressing plate.

4. Card reader as defined in claim 1 wherein said bearing arms are elastic.

5. Card reader as defined in claim 1 wherein said pressing plate is rounded or bevelled at the pivotably mounted end thereof.

6. Card reader as defined in claim 1 wherein said pressing plate is rounded or bevelled at the free end thereof.

7. Pressing element for a card reader, said card reader having a housing, said housing comprising a card support surface and an end wall, said pressing element comprising two bearing arms, each having a fixed end and a free end, wherein the fixed end of each bearing arm is mounted to said end wall and wherein a pressing plate is pivotably mounted to the free ends of said bearing arms by means of at least one torsion bar.

8. Pressing element as defined in claim 7 wherein said pressing element extends between said bearing arms.

9. Pressing plate as defined in claim 8 wherein a spring force acts on said pressing plate.

10. Pressing element as defined in claim 7 wherein said bearing arms are elastic.

11. Pressing plate as defined in claim 8 wherein said pressing plate is rounded or bevelled at the pivotably mounted end thereof.

12. Pressing plate as defined in claim 8 wherein said pressure plate is rounded or bevelled at the free end thereof.

* * * * *